US012665879B2

(12) United States Patent
Hooda et al.

(10) Patent No.: US 12,665,879 B2
(45) Date of Patent: \*Jun. 23, 2026

(54) SECURITY GROUP RESOLUTION AT INGRESS ACROSS VIRTUAL NETWORKS

(71) Applicant: Cisco Technology, Inc., San Jose, CA (US)

(72) Inventors: Sanjay Kumar Hooda, Pleasanton, CA (US); Prakash C. Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/919,222

(22) Filed: Oct. 17, 2024

(65) Prior Publication Data

US 2025/0039144 A1 Jan. 30, 2025

Related U.S. Application Data

(63) Continuation of application No. 17/526,164, filed on Nov. 15, 2021, now Pat. No. 12,212,544.

(51) Int. Cl.
*H04L 9/40* (2022.01)
*H04L 45/745* (2022.01)

(52) U.S. Cl.
CPC ........ *H04L 63/0263* (2013.01); *H04L 45/745* (2013.01); *H04L 63/0236* (2013.01); *H04L 63/0272* (2013.01)

(58) Field of Classification Search
None
See application file for complete search history.

(56) References Cited

U.S. PATENT DOCUMENTS 9,763,135 B1 * 9/2017 Shvarts ................. H04L 47/125
11,070,465 B2 * 7/2021 Kaplan ................... H04L 45/48
(Continued)

FOREIGN PATENT DOCUMENTS

WO WO2021222011 A1 11/2021

OTHER PUBLICATIONS

Office Action for U.S. Appl. No. 17/526,164, Dated Jun. 7, 2024, 17 pages.

(Continued)

*Primary Examiner* — Farid Homayounmehr
*Assistant Examiner* — Suman Debnath
(74) *Attorney, Agent, or Firm* — Lee & Hayes, P.C.

(57) ABSTRACT

Techniques and architecture are described for providing a service, e.g., a security service such as a firewall, across different virtual networks/VRFs/VPN IDs. The techniques and architecture provide modifications in enterprise computing fabrics by modifying pull-based overlay protocols such as, for example, locator/identifier separation protocol (LISP), border gateway protocol ethernet virtual private network (BGP EVPN), etc. A map request carries additional information to instruct a map-server that even though mapping (destination prefix and firewall service RLOC for the destination) is known within the map-server's own virtual network/VRF for firewall service insertion, the map-server still should do a lookup across virtual networks/VRFs and discover the final destination's DGT (destination group tag) and include that in the map reply.

20 Claims, 5 Drawing Sheets

(56)    References Cited

U.S. PATENT DOCUMENTS

| 2006/0227758 | A1  | 10/2006 | Rana et al. |
| 2012/0023217 | A1  | 1/2012 | Wakumoto |
| 2016/0352538 | A1  | 12/2016 | Chiu et al. |
| 2018/0367337 | A1* | 12/2018 | Jain ..................... H04L 12/4633 |
| 2020/0204483 | A1  | 6/2020 | Jain et al. |
| 2020/0245206 | A1* | 7/2020 | Allan ...................... H04L 45/04 |
| 2020/0403900 | A1* | 12/2020 | Uttaro ................. H04L 67/1008 |
| 2023/0155981 | A1  | 5/2023 | Hooda |

OTHER PUBLICATIONS

Office Action for U.S. Appl. No. 17/526,164, dated Sep. 25, 2024, 10 pages.

The PCT Search Report and Written Opinion mailed Mar. 2, 2023 for PCT application No. PCT/US2022/049768, 11 pages.

* cited by examiner

300

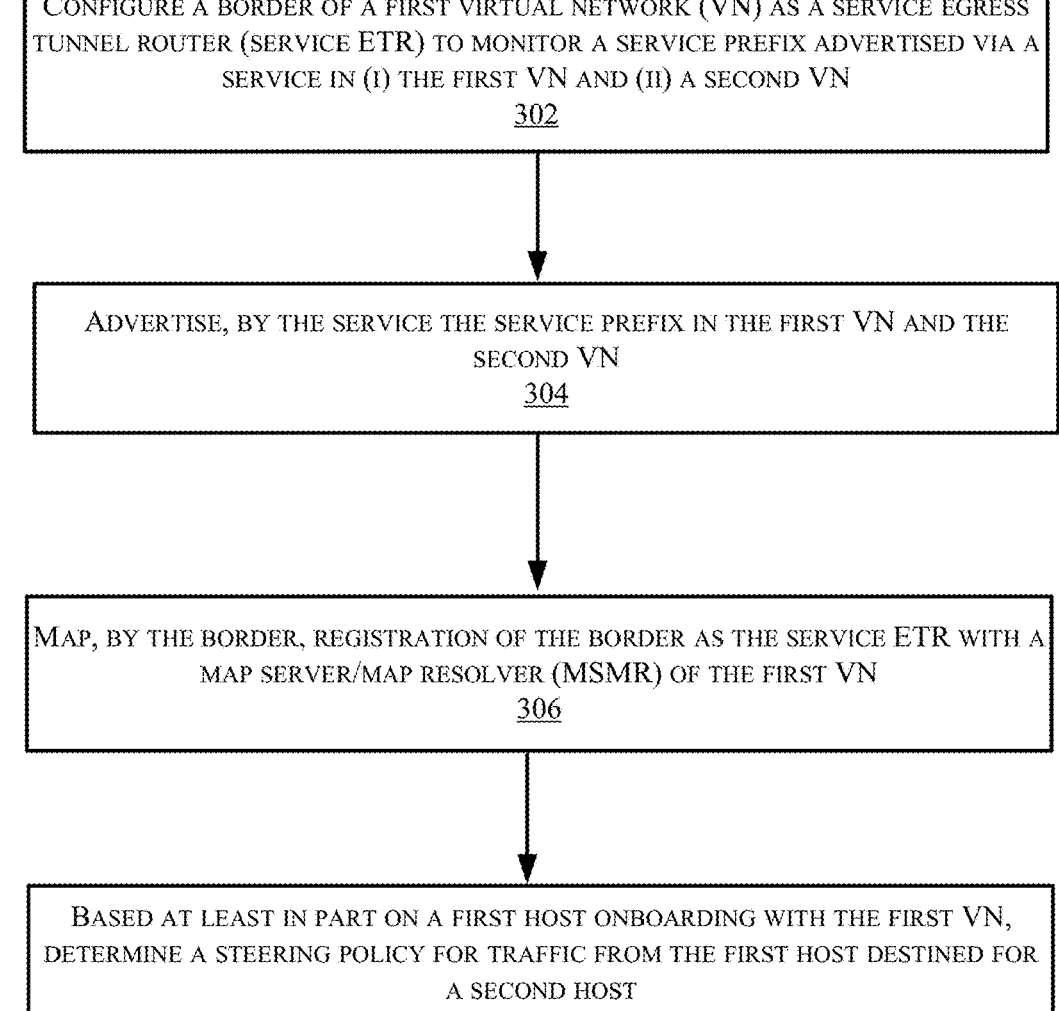

CONFIGURE A BORDER OF A FIRST VIRTUAL NETWORK (VN) AS A SERVICE EGRESS
TUNNEL ROUTER (SERVICE ETR) TO MONITOR A SERVICE PREFIX ADVERTISED VIA A
SERVICE IN (I) THE FIRST VN AND (II) A SECOND VN
302

ADVERTISE, BY THE SERVICE THE SERVICE PREFIX IN THE FIRST VN AND THE
SECOND VN
304

MAP, BY THE BORDER, REGISTRATION OF THE BORDER AS THE SERVICE ETR WITH A
MAP SERVER/MAP RESOLVER (MSMR) OF THE FIRST VN
306

BASED AT LEAST IN PART ON A FIRST HOST ONBOARDING WITH THE FIRST VN,
DETERMINE A STEERING POLICY FOR TRAFFIC FROM THE FIRST HOST DESTINED FOR
A SECOND HOST
308

BASED AT LEAST IN PART ON THE STEERING POLICY, ROUTE THE TRAFFIC VIA THE
FIRST VN AND THE SECOND VN TO THE SECOND HOST
310

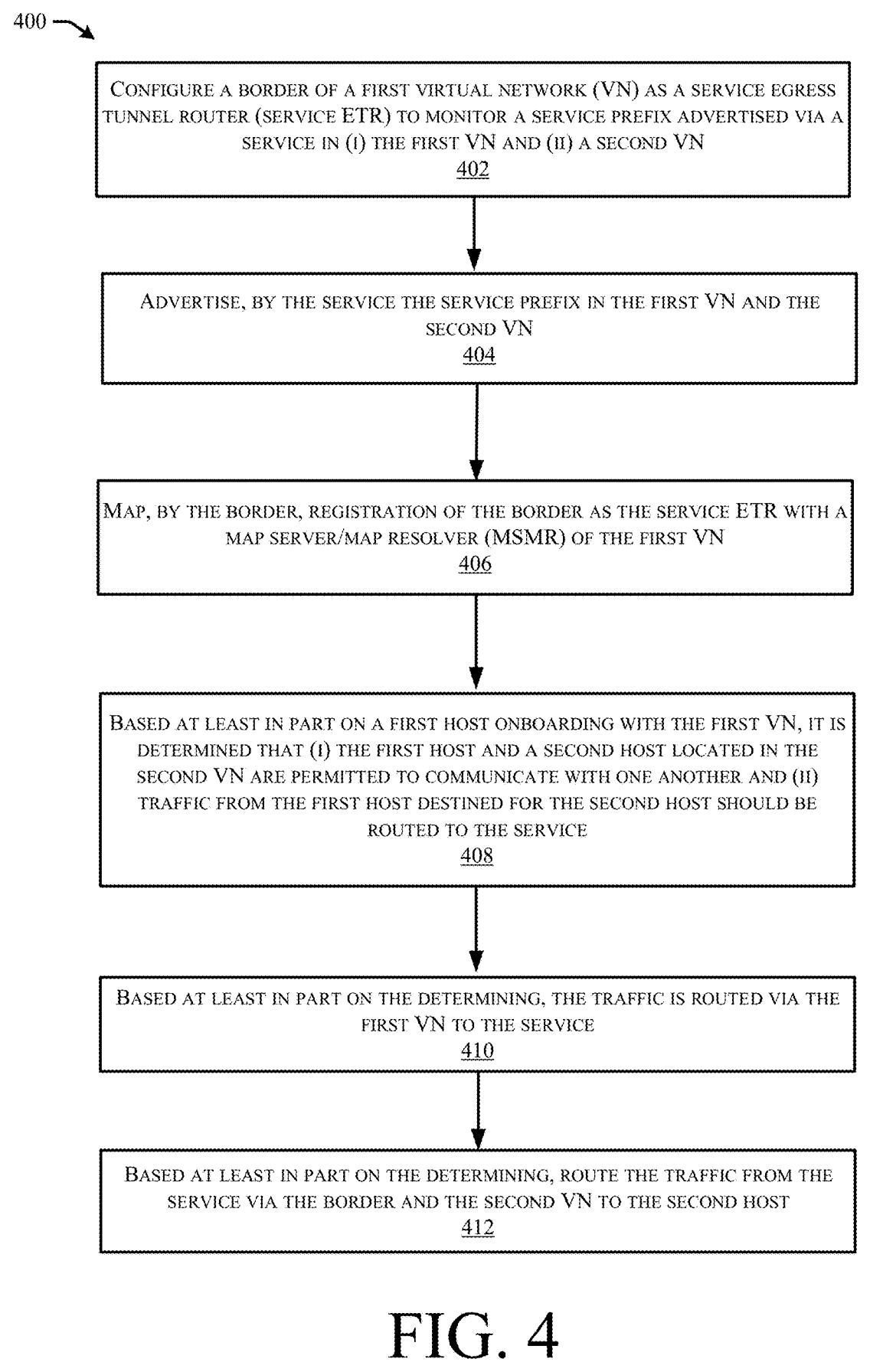

CONFIGURE A BORDER OF A FIRST VIRTUAL NETWORK (VN) AS A SERVICE EGRESS TUNNEL ROUTER (SERVICE ETR) TO MONITOR A SERVICE PREFIX ADVERTISED VIA A SERVICE IN (I) THE FIRST VN AND (II) A SECOND VN
402

↓

ADVERTISE, BY THE SERVICE THE SERVICE PREFIX IN THE FIRST VN AND THE SECOND VN
404

↓

MAP, BY THE BORDER, REGISTRATION OF THE BORDER AS THE SERVICE ETR WITH A MAP SERVER/MAP RESOLVER (MSMR) OF THE FIRST VN
406

↓

BASED AT LEAST IN PART ON A FIRST HOST ONBOARDING WITH THE FIRST VN, IT IS DETERMINED THAT (I) THE FIRST HOST AND A SECOND HOST LOCATED IN THE SECOND VN ARE PERMITTED TO COMMUNICATE WITH ONE ANOTHER AND (II) TRAFFIC FROM THE FIRST HOST DESTINED FOR THE SECOND HOST SHOULD BE ROUTED TO THE SERVICE
408

↓

BASED AT LEAST IN PART ON THE DETERMINING, THE TRAFFIC IS ROUTED VIA THE FIRST VN TO THE SERVICE
410

↓

BASED AT LEAST IN PART ON THE DETERMINING, ROUTE THE TRAFFIC FROM THE SERVICE VIA THE BORDER AND THE SECOND VN TO THE SECOND HOST
412

FIG. 4

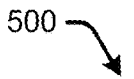
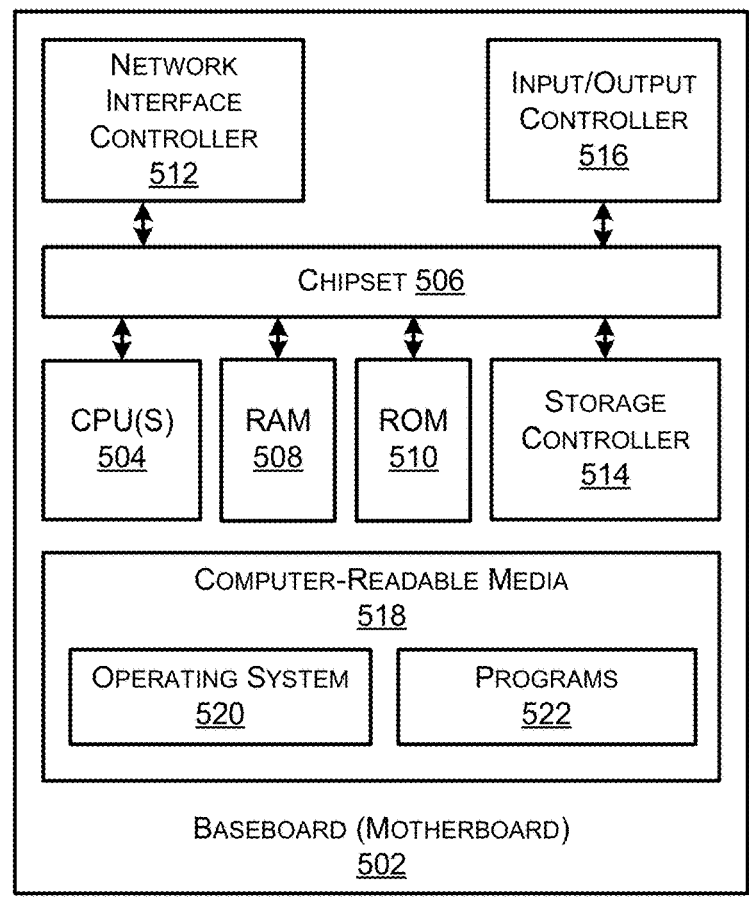
FIG. 5

SECURITY GROUP RESOLUTION AT INGRESS ACROSS VIRTUAL NETWORKS

CROSS-REFERENCE TO RELATED APPLICATION

This patent application is a continuation of and claims priority to U.S. patent application Ser. No. 17/526,164, filed Nov. 15, 2021, which is fully incorporated herein by reference.

TECHNICAL FIELD

The present disclosure relates generally to dynamically resolving group tags for services in virtual networks (VNs)/ virtual routing and forwarding (VRFs)/virtual public network identifications (VPN IDs) at ingress for steering policies across VNs/VRFs/VPN IDs, and more particularly to to dynamically resolving security source group tags and security destination group tags for security services such as firewalls in VNs/VRFs/VPN IDs at ingress for steering policies across VNs/VRFs/VPN IDs.

BACKGROUND

In situations where networking and security are integrated together in a network, security tags, e.g., security source group tags and security destination group tags, may be used to classify and provide policy enforcement for segmentation and security policy enforcement to steer traffic in the network. For example, the group tags may be used to steer traffic to a firewall. However, the use of the tag for steering traffic to the firewall is generally limited to use within a particular virtual network/VRF/VPN ID. In other words, the use of the group tags are generally used to steer traffic when the source and destination are within the same virtual network/VRF/VPN ID. This limitation arises due to the fact that Internet Protocol-security group tag (IP-SGT) bindings are stored within a forwarding context. This arrangement generally works well for access control policies but does not work well for firewall insertion since users generally want to move to firewall insertion based on the group policy instead of an inline insertion mode. Thus, the users would like to maintain use cases with firewall support across virtual network/VRF insertion of firewalls but still be based on the traffic steering policy. In particular, users do not care if a source host or destination host are within the same virtual network or if the destination host is across the virtual network/VRF, e.g., the source host is in a first virtual network/VRF and the destination host/VRF is in a second virtual network/VRF. Generally, the users just want to send traffic based on security for source group tags and destination group tags.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for providing a service, e.g., a security service such as a firewall, across different virtual networks/VRFs/VPN IDs.

FIG. 4 illustrates a flow diagram of an example method for providing a service, e.g., a security service such as a firewall, across different virtual networks/VRFs/VPN IDs.

FIG. 5 is a computer architecture diagram showing an example computer hardware architecture for implementing a device that can be utilized to implement aspects of the various technologies presented herein.

DESCRIPTION OF EXAMPLE EMBODIMENTS

Overview

Figure 1:
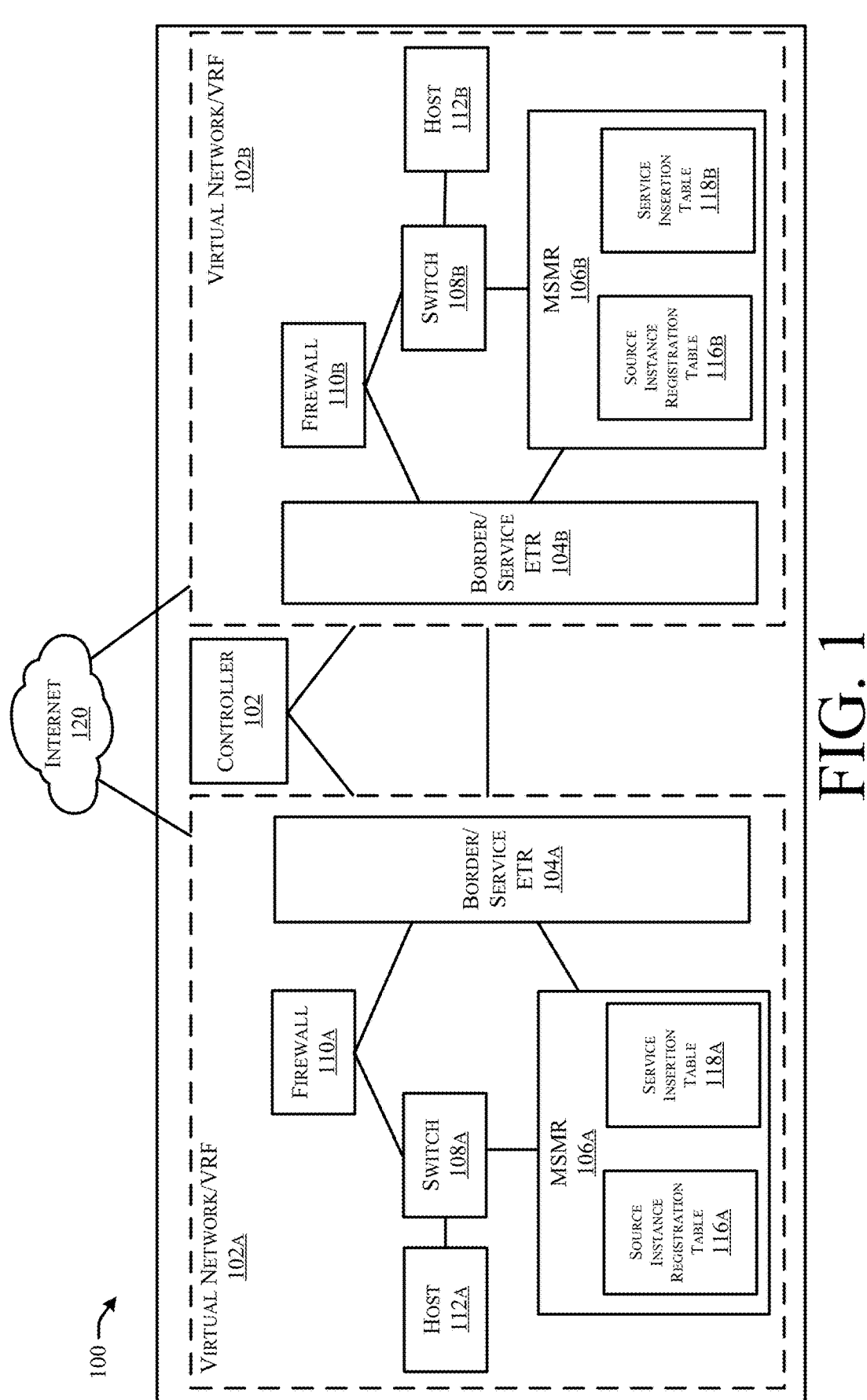
FIG. 1 schematically illustrates a network that includes two virtual networks/VRFs.

The present disclosure describes techniques and architecture for providing a service, e.g., a security service such as a firewall, across different virtual networks/VRFs/VPN IDs (referred to collectively herein as virtual networks). The techniques and architecture provide modifications in enterprise computing fabrics by modifying pull-based overlay protocols such as, for example, locator/identifier separation protocol (LISP), border gateway protocol ethernet virtual private network (BGP EVPN), etc. A map request carries additional information to instruct a map-server that even though mapping (destination prefix and firewall service RLOC for the destination) is known within the map-server's own virtual network/VRF for firewall service insertion, the map-server still should do a lookup across virtual networks/ VRFs and discover the final destination's DGT (destination group tag) and include that in the map reply.

In particular, a border of a first virtual network is configured as a service ETR. In configurations, a network controller configures the border to monitor a service prefix advertised via a service in the first virtual network as well as a second virtual network, e.g., across the two virtual networks. The service advertises the service prefix in the first virtual network and the second virtual network. For example, the service may be a security service such as a firewall. The firewall may advertise its service prefix in the first virtual network and the second virtual network indicating that the firewall can handle traffic that originates in both the first virtual network and the second virtual network. The border is registered with a map server/map resolver (MSMR) in the first virtual network as the service ETR for the service.

A first host, e.g., a source host, is located behind a switch in the first virtual network. A second host, e.g., a destination host, is located behind a switch in the second virtual network. The first host wishes to communicate with the second host. Since the controller has configured the border of the first virtual network as a service ETR, this indicates that the border has services located behind the border. The service ETR is used to apply the service. In situations, the border is usually a default ETR. However, in configurations as described herein, the border is registering itself with the MSMR that the service is behind the border and the service may be provided for the first virtual network and the second virtual network. Thus, the border is registering itself as a service ETR with the MSMR for the service, e.g., the firewall, for both the first virtual network and the second virtual network.

As previously noted, the service, e.g., the firewall, advertises its service prefix in both the first virtual network and the second virtual network. Thus, the service is indicating that it can handle traffic originating from both the first virtual network and the second virtual network. Therefore, traffic originating from both the first host and the second host may be handled by the service. The registration of the border as a service ETR for the service is a special registration. In other words, the border is registering that it is a service ETR for the service for traffic originating from both the first host and the second host.

In configurations, after a first host, e.g., a source host onboards, the first host is indicating that it is in the first virtual network to the MSMR. During the onboarding and communication with the MSMR, the first host provides its security group to the MSMR and requests from the MSMR "where is my firewall?" Thus, the MSMR indicates to the first host that the first host's firewall is the firewall for which the border is the service ETR, e.g., the firewall within the first virtual network. The MSMR now knows that traffic from the first host needs to go to the firewall in the first virtual network and the border of the first virtual network.

When the first host generates traffic to send to a second host in a second virtual network, the traffic arrives at the switch of the first network behind which the first host is located. The first switch makes a map request, e.g., a request for resolution of the steering policy, to the MSMR for the destination host in the second virtual network, e.g., the second host. The MSMR provides a reply to the switch. The reply includes a steering policy that generally indicates whether or not the first host is permitted to communicate with the second host. Based on the security group tag of the first host, the MSMR also replies with the steering policy indicating the service ETR (e.g., the border) of the firewall service and that the traffic from the first host destined for the second host needs to be forwarded to the firewall service. If the MSMR route mapping, e.g., steering policy, indicates that, based on one or more of the destination routing locator (RLOC), the destination ID, the source group tag and/or the destination group tag, the traffic does not need to be forwarded to the firewall service, then the switch of the first network may forward the traffic directly to the switch of the second network, which may then forward the traffic to the second host. However, if the route mapping from the MSMR indicates that the traffic needs to be forwarded to the firewall service, then the traffic from the first host is encapsulated by the first switch, which forwards the encapsulated traffic to the border, e.g., the service ETR. The border decapsulates the traffic and sends the traffic to the firewall service. If the firewall service permits the traffic to be forwarded to the second host, then the firewall service forwards the traffic back to the border, which encapsulates the traffic and sends the traffic to the second switch of the second virtual network. The second switch then decapsulates the traffic and sends the traffic to the second host. In situations, the destination within the second virtual network is not known. Thus, the MSMR may instruct the traffic to be forwarded via the border to the Internet.

In configurations, the firewall service may withdraw its services, e.g., withdraw the routes associated with the firewall service for traffic among hosts. In such instances, the border may be de-registered as the service ETR for the firewall service with the MSMR. A different firewall, e.g., a second firewall service in the first virtual network or a firewall service within the second virtual network, may then need to be used, with a corresponding border being registered as a service ETR for the new firewall service.

As an example, a method may include configuring a border of a first virtual network (VN) as a service egress tunnel router (ETR) to monitor a service prefix advertised via a service in (i) the first VN and (ii) a second VN and advertising, by the service, the service prefix in the first VN and the second VN. The method may also include mapping, by the border with a controller of the first VN, registration of the border as the service ETR and based at least in part on a first host onboarding with the first VN, determining a steering policy for traffic from the first host destined for a second host, wherein the second host is located in one of the first VN or the second VN. The method may further include based at least in part on the steering policy, routing the traffic via at least one of the first VN and the second VN to the second host. The determining the steering policy for traffic from the first host destined for the second host may include receiving, at a switch of the first VN, traffic from the first host destined for the second host, based at least in part on receiving the traffic, sending, by the switch of the first VN to the controller of the first VN, a map request relating to the second host in the second VN, based at least in part on the map request, determining, by the controller of the first VN, that (i) the first host in the first VN and the second host are permitted to communicate with one another and (ii) the traffic is required to go to the service, and based at least in part on the determining that (i) the first host in the first VN and the second host are permitted to communicate with one another and (ii) the traffic is required to go to the service, receiving, at the switch of the first VN from the controller of the first VN, an address for the service, a destination VN, and a destination group tag.

In configurations, determining the steering policy comprises determining (i) the first host and the second host are permitted to communicate with one another and (ii) the traffic should be routed to the service. The method may also include routing the traffic via the first VN to the service. The method may further include routing the traffic from the service via the border and the second VN to the second host.

In configurations determining the steering policy for traffic from the first host destined for the second host comprises requesting, by a switch of the first VN from the controller of the first VN, a resolution of the steering policy for the service ETR and based at least in part on requesting a service mapping, receiving, by the switch of the first VN from the controller of the first VN, one or more of the service ETR, a destination address, a destination instance-identification (ID)/VN, or a destination group tag.

In configurations, determining the resolution of the steering policy for the service ETR for traffic from the first host destined for the second host comprises searching, by the controller of the first VN, a source instance registration table for the service mapping comprising one or more of the service ETR, the destination address, the destination instance-ID, and the destination group tag and if the steering policy is not available in the source instance registration table, searching, by the controller of the first VN, a service insertion table for the steering policy comprising one or more of the destination address, the destination instance-IDVN, or the destination group tag.

In configurations, determining the steering policy for traffic from the first host destined for the second host comprises receiving, at a switch of the first VN, traffic from the first host destined for the second host and based at least in part on receiving the traffic, sending, by the switch of the first VN to the controller of the first VN, a map request relating to the second host in the second VN. The determining the steering policy may also comprise based at least in part on the map request, determining, by the controller of the first VN that (i) the first host in the first VN and the second host are permitted to communicate with one another and (ii)

the traffic is required to go to the service, and based at least in part on the determining that (i) the first host in the first VN and the second host are permitted to communicate with one another and (ii) the traffic is required to go to the service, receiving, at the switch of the first VN from the controller of the first VN, an address for the service, a destination VN, and a destination group tag.

In configurations, determining the steering policy for traffic from the first host destined for the second host comprises receiving, at a switch of the first VN, traffic from the first host destined for the second host and based at least in part on receiving the traffic, sending, by the switch of the first VN to the controller of the first VN, a map request relating to the second host in the second VN. The determining the steering policy may also comprise based at least in part on the map request, determining, by the controller of the first VN that (i) the first host in the first VN and the second host are permitted to communicate with one another and (ii) the traffic is not required to go to the service, and based at least in part on the determining that (i) the first host in the first VN and the second host are permitted to communicate with one another and (ii) the traffic is not required to go to the service, receiving, at the switch of the first VN from the controller of the first VN, one or more of a destination group tag, a destination VN, or a destination instance ID.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a network 100 that includes two virtual networks/VRFs 102*a*, 102*b* (referred to herein as virtual networks 102). In configurations, the virtual networks 102*a*, 102*b* may be configured as VPNs having an identification (VPN ID). The network 100 may (and generally does) include more than two virtual networks 102.

The first virtual network 102*a* may include one or more borders 104*a*, a map server/map resolver (MSMR) 106*a*, and one or more switches 108*a*. The first virtual network 102*a* may include one or more services 110*a*. In the example of FIG. 1 described herein, the service 110*a* is a security service such as a firewall service 110*a*. In configurations, the first virtual network 102*a* may include multiple firewall services 110*a* as well as other services such as, for example, an accounting service. A first host 112*a* is included within the first virtual network 102*a*. The first virtual network 102*a* may (and generally does) include more than one host 112*a*.

The second virtual network 102*b* may include one or more borders 104*b*, a map server/map resolver (MSMR) 106*b*, and one or more switches 108*b*. The second virtual network 102*b* may include one or more services 110*b*. In the example of FIG. 1 described herein, the service 110*b* is a security service such as a firewall service 110*b*. In configurations, the second virtual network 102*b* may include multiple firewall services 110*b* as well as other services such as, for example, an accounting service. A second host 112*b* is included within the second virtual network 102*b*. The second virtual network 102*b* may (and generally does) include more than one host 112*b*.

In an example configuration, the border 104*a* of the first virtual network 102*a* is configured as a service ETR by a network controller 114 to monitor a service prefix advertised via the firewall service 110*a* in the first virtual network 102*a* as well as the second virtual network 102*b*, e.g., across the two virtual networks 102. The firewall service 110*a* advertises the service prefix in the first virtual network 102*a* and the second virtual network 102*b*. The firewall service 110*a* may advertise its service prefix in the first virtual network 102*a* and the second virtual network 102*b* indicating that the firewall service 110*a* can handle traffic that originates in both the first virtual network 102*a* and the second virtual network 102*b*. The border 104*a* registers with the MSMR 106*a* in the first virtual network 102*a* as the service ETR for the firewall service 110*a*.

The first host 112*a* is located behind the switch 108*a* in the first virtual network 102*a*. The second host 112*b* is located behind the switch 108*b* in the second virtual network 102*b*. In the present example, the first host 112*a* wishes to communicate with the second host 112*b*. Since the controller 114 has configured the border 104*a* of the first virtual network 102*a* as a service ETR for the firewall service 110*a*, this indicates that the border 104*a* has services located behind the border 104*a*, e.g., the firewall service 110*a*. The border 104*a* acting as the service ETR is used to apply the firewall service 110*a*. Thus, in configurations as described herein, the border 104*a* is registering itself with the MSMR 106*a* that the firewall service 110*a* is behind the border 104*a* and the firewall service 110*a* may be provided for the first virtual network 102*a* and the second virtual network 102*b*. Thus, the border 104*a* is registering itself as a service ETR with the MSMR 106*a* for the firewall service 110*a* for both the first virtual network 102*a* and the second virtual network 102*b*.

The firewall service 110*a* advertises its service prefix in both the first virtual network 102*a* and the second virtual network 102*b*. Thus, the firewall service 110*a* is indicating that it can handle traffic originating from both the first virtual network 102*a* and the second virtual network 102*b*. Therefore, traffic originating from both the first host 112*a* and the second host 12*b* may be handled by the firewall service 110*a*. The registration of the border 104*a* as a service ETR for the firewall service 110*a* is a special registration. In other words, the border 104*a* is registering that it is a service ETR for the firewall service 110*a* for traffic originating from both the first host 112*a* and the second host 112*b*, e.g., traffic originating in both the first virtual network 102*a* and the second virtual network 102*b*.

In configurations, when the first host 112*a* onboards the first virtual network 102*a*, the first host 112*a* is indicating that it is in the first virtual network 102*a* to the MSMR 106*a*. During the onboarding and communication with the MSMR 106*a*, the first host 112*a* provides its security group to the MSMR 106*a* and requests from the MSMR 106*a* "where is my firewall?" Thus, the MSMR 106*a* indicates to the first host 112*a* that the first host's firewall service is the firewall service 110*a* for which the border 104*a* is the service ETR. The MSMR 106*a* now knows that traffic from the first host 112*a* needs to go to the firewall in the first virtual network 102*a* and the border 104*a* of the first virtual network 102*a*.

When the first host (source host) 112*a* generates traffic to send to the second host (destination host) 112*b* in the second virtual network 102*b*, the traffic arrives at the switch 108*a* of the first virtual network 102a behind which the first host 112a is located. The first switch 108a makes a map request, e.g., a request for resolution of the steering policy, to the MSMR 106a for the destination host, e.g., the second host 102b, in the second virtual network 102b. The map request includes additional information to instruct MSMR 106a that even though mapping (destination prefix and firewall service RLOC for the destination) is known within the MSMR's own virtual network 102a for firewall service 110a insertion, the MSMR 106a still should do a lookup across virtual networks, e.g., a look-up in virtual network 102b, and discover the second host 112b's destination group tag and include that information in the map reply. The look-up across virtual networks may comprise looking up the information in other MSMRs, e.g., MSMR 106b.

The registration of the border 104a as a service ETR for the firewall service 110a, as well as route mapping, e.g., steering policy, including one or more of a destination ID, e.g., a destination endpoint identifier (EID), a service/firewall routing locator (RLOC) in the source virtual network, e.g., virtual network 102a (this RLOC may contain vendor specific LCAF for service insertion to differentiate from the destination RLOC), a destination RLOC in the destination virtual network, e.g., virtual network 102b, destination virtual network ID, the destination group tag, in particular the DGT destination routing locator (RLOC), and/or the source group tag, may be stored in one or more of a source instance registration table 116a and/or a service insertion table 118a in MSMR 106a. Additional service registrations and steering policies may also be stored in one or more of the source instance registration table 116a and/or the service insertion table 118a in MSMR 106a. The MSMR 106b may also include one or more of a source instance registration table 116b and/or a a service insertion table 118b.

The MSMR 106a and the MSMR 106b maintains a service insertion policy to indicate which virtual networks/VRFs need to be searched to find destination attributes. Using the "service-insertion" command listed below in the configuration, a list of virtual networks is built across which the searching by the MSMRs 106a, 106b may be performed. In some other cases there may be a default option of looking up all virtual networks/VRFs in case the number of virtual networks/VRFs in the deployment is limited/less and the user is trying to apply traffic steering or any other policy at ingress.

```
Possible/example Configuration may be as follows:
Border :
. . .
instance-id 1 & 2 (where firewall needs to inserted)
. . .
database-mapping  <default-route-prefix/mask-length>
[service-insertion  <id> <firewall>] locator-set set1 service-etr
/* Local internet route available, so firewall service can be registered */
/* Service EID = route prefix of firewall */
!
MSMR:
. . .
service-insertion
instance-id 1
10.1.1.0/24
ip-any
service-insertion <id> {firewall}
!
instance-id 2
20.1.1.0/24
ip-any
service-insertion <id> {firewall}
!
. . .
```

The MSMR 106a searches the source instance registration table 116a and/or the service insertion table 118a and provides a map reply to the switch 108a. The map reply includes a steering policy that generally indicates whether or not the first host 112a is permitted to communicate with the second host 112b. The route mapping, e.g., steering policy, may also indicate that, based on one or more of one or more of a destination ID, e.g., a destination endpoint identifier (EID), a service/firewall routing locator (RLOC) in the source virtual network, e.g., virtual network 102a (this RLOC may contain vendor specific LCAF for service insertion to differentiate from the destination RLOC), a destination RLOC in the destination virtual network, e.g., virtual network 102b, destination virtual network ID, the destination group tag, in particular the DGT destination routing locator (RLOC), the source group tag and/or the destination group tag based on the security group tag of the first host 112a, that the traffic from the first host 112a destined for the second host 112b needs to be forwarded to the firewall service 110a.

If the MSMR 106a route mapping, e.g., steering policy, indicates that, based on one or more of the destination routing locator (RLOC), the destination ID, the source group tag and/or the destination group tag, the traffic does not need to be forwarded to the firewall service 110, then the switch 108a of the first network 102a may forward the traffic directly to the switch 108b of the second network 102b, which may then forward the traffic to the second host 112b. However, if the route mapping from the MSMR 106a indicates that the traffic needs to be forwarded to the firewall service 110a, then the traffic from the first host 112a is encapsulated by the first switch 108a, which forwards the encapsulated traffic to the border 104a, e.g., the service ETR. The border 104a decapsulates the traffic and sends the traffic to the firewall service 110a. If the firewall service 110a permits the traffic to be forwarded to the second host 112b, then the firewall service 110a forwards the traffic back to the border 104a, which encapsulates the traffic and sends the traffic to the second switch 108b of the second virtual network 102b. The second switch 108b then decapsulates the traffic and sends the traffic to the second host 112b.

In some situations, the destination of the traffic is not known, e.g., the address of the destination can not be found in either MSMR 106a or MSMR 106b. In such situations, calculation of hole, i.e., NMR (negative map reply) or UMR (unknown map reply), prefix is based on prefixes across all virtual networks/VRFs in the service insertion policy, thus allowing the traffic to flow for unknown and known destinations. A reserved DGT may be used for unknown/Internet destinations in such situations, which is registered with border/ETR registration. Thus, the MSMR 106a may instruct the traffic to be forwarded via the border 104a to the Internet 120.

In configurations, the firewall service 110a may withdraw its services, e.g., withdraw the routes associated with the firewall service 110a for traffic among hosts 112. In such instances, the border 104a may be de-registered as the service ETR for the firewall service 110a with the MSMR 106a. A different firewall, e.g., a second firewall service in the first virtual network 102a or the firewall service 110b within the second virtual network 102b, may then need to be used, with a corresponding border 104 being registered as a service ETR with one of MSMR 106a or MSMR 106b for the new firewall service.

Figure 2:
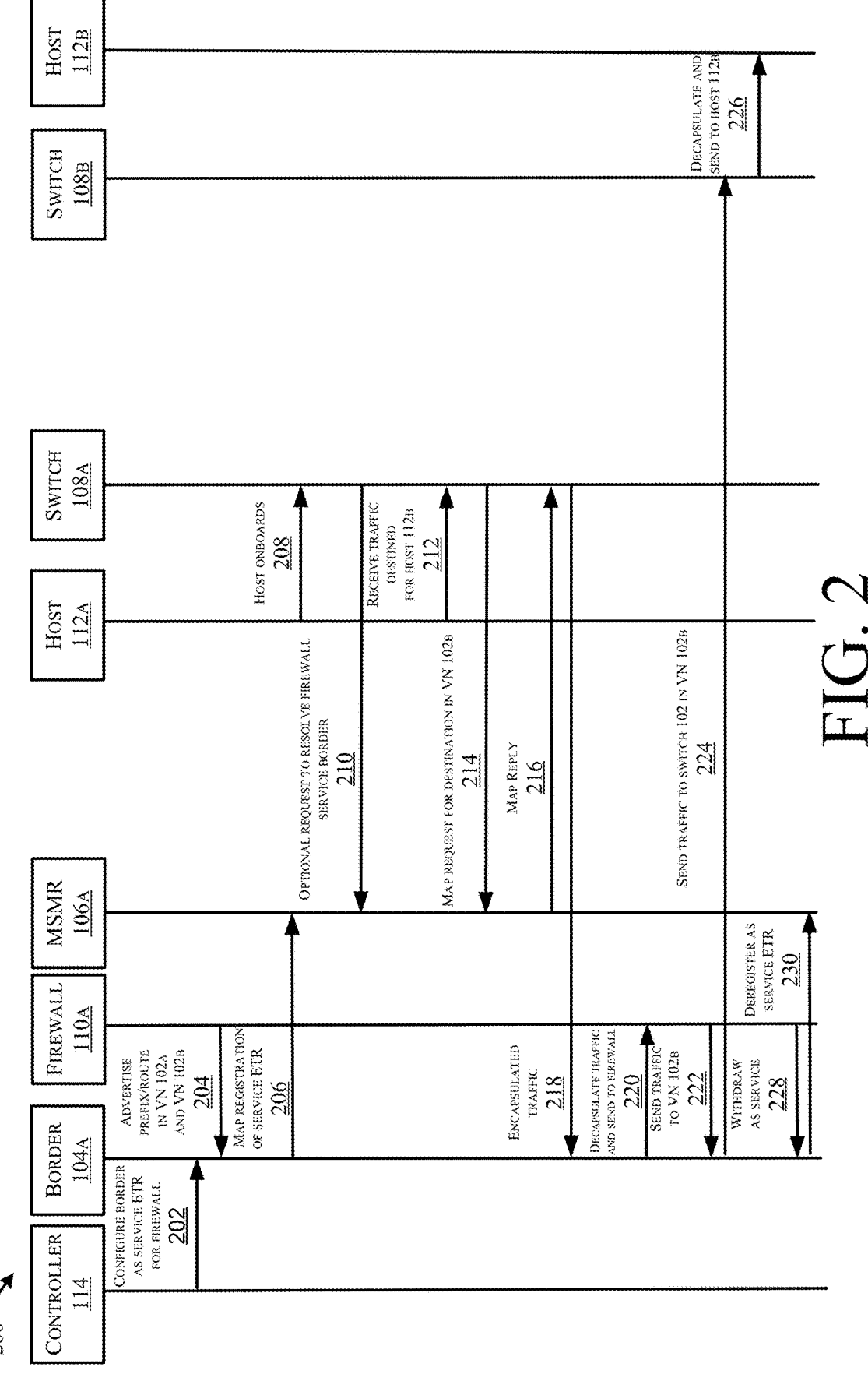
FIG. 2 illustrates an example flow of providing modifications in enterprise computing fabrics by modifying pull-based overlay protocols.

FIG. 2 illustrates an example flow 200 of providing modifications in enterprise computing fabrics by modifying pull-based overlay protocols such as, for example, locator/ identifier separation protocol (LISP), border gateway protocol ethernet virtual private network (BGP EVPN), etc. A map request carries additional information to instruct a map-server that even though mapping (destination prefix and firewall service RLOC for the destination) is known within the map-server's own virtual network/VRF for firewall service insertion, the map-server still should do a lookup across virtual networks/VRFs and discover the final destination's DGT (destination group tag) and include that in the map reply.

At 202, the controller 114 configures the border 104a as a service ETR, e.g., as a LISP service ETR, with firewall service, e.g., firewall service 110a. The configuration of border 104a as a service ETR is to monitor firewall prefix/routes associated with and advertised by the firewall service 110a in the virtual network 102a.

At 204, the firewall service 110a advertises its prefix/routes in the virtual networks 102a, 102b. Thus, the firewall service 110a is indicating that it can handle traffic originating from both the first virtual network 102a and the second virtual network 102b. Therefore, traffic originating from both the first host 112a and the second host 12b may be handled by the firewall service 110a. The border 104a monitors the firewall service 110a prefix/route.

At 206, the border 104a maps registration of service ETR with firewall service with the MSMR 106a. Thus, the border 104a monitors firewall prefix/routes and registers with the MSMR 106a in the first virtual network 102a as the service ETR for the firewall service 110a. The registration of the border 104a as a service ETR for the firewall service 110a is a special registration. In other words, the border 104a is registering that it is a service ETR for the firewall service 110a for traffic originating from both the first host 112a and the second host 112b, e.g., traffic originating in both the first virtual network 102a and the second virtual network 102b. The service registration of the border 104a as a service ETR for the firewall service 110a, as well as route mapping, e.g., steering policy, including destination routing locator (RLOC), the destination ID, the source group tag, and/or the destination group tag, may be stored in one or more of a source instance registration table 116a and/or a service insertion table 118a in MSMR 106a. Additional service registrations and steering policies may also be stored in one or more of the source instance registration table 116a and/or the service insertion table 118a in MSMR 106a. The MSMR 106b may also include one or more of a source instance registration table 116b and/or a a service insertion table 118b where this information may be stored as well as additional service registrations and steering policies.

At 208, the first host 112a onboards (joins) the first virtual network 102a. During the onboarding, the first host 112a is indicating that it is in the first virtual network 102a to the MSMR 106a. During the onboarding and communication with the MSMR 106a, the first host 112a provides its security group to the MSMR 106a and requests from the MSMR 106a "where is my firewall?" Thus, the MSMR 106a indicates to the first host 112a that the first host's firewall service is the firewall service 110a for which the border 104a is the service ETR. The MSMR 106a now knows that traffic from the first host 112a needs to go to the firewall in the first virtual network 102a and the border 104a of the first virtual network 102a.

At 210, an optional step may occur where the first switch 108a asks the MSMR 106a to resolve the the firewall service's service border. This occurs in configurations where the steering policy is applied at the first switch 108a. Thus, based at least in part on the requesting the steering policy, the switch 108a may receive from the MSMR 106a one or more of the service ETR, a destination routing locator (RLOC), a destination ID, and/or a destination group tag.

At 212, the first switch 108a receives traffic from the first host 112a in the first virtual network 102a. In this example, the traffic is destined for host 112b.

At 214, the first switch 108a makes a map request to the MSMR 106a for the destination host, e.g., the second host 102b, in the second virtual network 102b. The map request includes additional information to instruct MSMR 106a that even though mapping (destination prefix and firewall service RLOC for the destination) is known within the MSMR's own virtual network 102a for firewall service 110a insertion, the MSMR 106a still should do a lookup across virtual networks, e.g., a look-up in virtual network 102b, and discover the second host 112b's destination group tag and include that information in the map reply. The look-up across virtual networks may comprise looking up the information in other MSMRs, e.g., MSMR 106b. The MSMR 106a searches or does a look-up in the source instance registration table 116a and then in the service insertion table 118a if necessary, which has service insertion policy configured. The MSMR 106a finds the destination for VN 102b subnet address in instances/VRFs of service insertion table.

At 216, the MSMR 106a provides a map reply to the first switch 108a. The map reply includes a steering policy that generally indicates whether or not the first host 112a is permitted to communicate with the second host 112b. The route mapping, e.g., steering policy, may also indicate that, based on one or more of one or more of a destination ID, e.g., a destination endpoint identifier (EID), a service/firewall routing locator (RLOC) in the source virtual network, e.g., virtual network 102a (this RLOC may contain vendor specific LCAF for service insertion to differentiate from the destination RLOC), a destination RLOC in the destination virtual network, e.g., virtual network 102b, destination virtual network ID, the destination group tag, in particular the DGT destination routing locator (RLOC), the source group tag and/or the destination group tag based on the security group tag of the first host 112a, that the traffic from the first host 112a destined for the second host 112b needs to be forwarded to the firewall service 110a.

At 218, the traffic from the first host 112a is encapsulated by the first switch 108a, which forwards the encapsulated traffic to the border 104a, e.g., the service ETR. The switch inserts map cache with the RLOC from the steering policy. The RLOC is either a service RLOC (send traffic to firewall service 110a), destination RLOC (send directly to the destination, e.g., host 112b), or a native forward (for non-SDA), as per the SGT/DGT. At 220, the border 104a decapsulates the traffic and sends the traffic to the firewall service 110a.

At 222, if the firewall service 110a permits the traffic to be forwarded to the second host 112b, then the firewall service 110a forwards the traffic back to the border 104a. At 224, using the map cache, the border 104a encapsulates the traffic and sends the traffic to the second switch 108b of the second virtual network 102b. At 226, the second switch 108b then decapsulates the traffic and sends the traffic to the second host 112b.

In configurations, at 228, the firewall service 110a withdraws as a service. Thus, at 230 the border 104a de-registers as a service ETR with firewall service with the MSMR 106a. A different firewall, e.g., a second firewall service in the first virtual network 102a or the firewall service 110b within the second virtual network 102b, may then need to be used, with a corresponding border 104 being registered as a service ETR with one of MSMR 106*a* or MSMR 106*b* for the new firewall service.

FIGS. 3 and 4 illustrate flow diagrams of example methods 300 and 400, respectively, and illustrate aspects of the functions performed at least partly by network devices of a network as described with respect to FIGS. 1 and 2. The logical operations described herein with respect to FIGS. 3 and 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for providing a service, e.g., a security service such as a firewall, across different virtual networks/VRFs/VPN IDs (referred to collectively as virtual networks (VNs). In some examples, the method 300 may be performed by a system comprising one or more processors and one or more non-transitory computer-readable media storing computer-executable instructions that, when executed by the one or more processors, cause the one or more processors to perform the method 300.

At 302, a border of a first virtual network (VN) is configured as a service egress tunnel router (service ETR) to monitor a service prefix advertised via a service in (i) the first VN and (ii) a second VN. For example, the controller 114 may configure the border 104*a* of the first virtual network 102*a* as a service ETR for the firewall service 110*a*.

At 304, the service advertises the service prefix in the first VN and the second VN. For example, the firewall service 110*a* may advertise its prefix/route in the first virtual network 102*a* and the second virtual network 102*b*.

At 306, the border maps registration of the border as the service ETR with a map server/map resolver (MSMR) of the first VN. For example, the border 104*a* may map registration of the border 104*a* as the service ETR with the MSMR 106*a* of the first VN 102*a*.

At 308, based at least in part on a first host onboarding with the first VN, a steering policy is determined for traffic from the first host destined for a second host. For example, the first host 112*a* may onboard/join with the first VN 102*a*. The MSMR 106*a* may determine a steering policy that generally indicates whether or not the first host 112*a* is permitted to communicate with the second host 112*b*. The route mapping, e.g., steering policy, may also indicate that, based on one or more of the destination routing locator (RLOC), the destination ID, the source group tag and/or destination group tag based on the security group tag of the first host 112*a*, that the traffic from the first host 112*a* destined for the second host 112*b* may need to be forwarded to the firewall service 110*a*.

At 310, based at least in part on the steering policy, the traffic is routed via the first VN and the second VN to the second host. For example, if the steering policy indicates that, based on one or more of the destination routing locator (RLOC), the destination ID, the source group tag and/or the destination group tag, the traffic does not need to be forwarded to the firewall service 110, then the switch 108*a* of the first network 102*a* may forward the traffic directly to the switch 108*b* of the second network 102*b*, which may then forward the traffic to the second host 112*b*. However, if the steering policy from the MSMR 106*a* indicates that the traffic needs to be forwarded to the firewall service 110*a*, then the traffic from the first host 112*a* is encapsulated by the first switch 108*a*, which forwards the encapsulated traffic to the border 104*a*, e.g., the service ETR. The border 104*a* decapsulates the traffic and sends the traffic to the firewall service 110*a*. If the firewall service 110*a* permits the traffic to be forwarded to the second host 112*b*, then the firewall service 110*a* forwards the traffic back to the border 104*a*, which encapsulates the traffic and sends the traffic to the second switch 108*b* of the second virtual network 102*b*. The second switch 108*b* then decapsulates the traffic and sends the traffic to the second host 112*b*.

FIG. 4 illustrates another flow diagram of another example method 400 for providing a service, e.g., a security service such as a firewall, across different virtual networks/VRFs/VPN IDs (referred to collectively as virtual networks (VNs). In some examples, the method 300 may be performed by a system comprising one or more processors and one or more non-transitory computer-readable media storing computer-executable instructions that, when executed by the one or more processors, cause the one or more processors to perform the method 400.

At 402, a border of a first virtual network (VN) is configured as a service egress tunnel router (service ETR) to monitor a service prefix advertised via a service in (i) the first VN and (ii) a second VN. For example, the controller 114 may configure the border 104*a* of the first virtual network 102*a* as a service ETR for the firewall service 110*a*.

At 404, the service advertises the service prefix in the first VN and the second VN. For example, the firewall service 110*a* may advertise its prefix/route in the first virtual network 102*a* and the second virtual network 102*b*.

At 406, the border maps registration of the border as the service ETR with a map server/map resolver (MSMR) of the first VN. For example, the border 104*a* may map registration of the border 104*a* as the service ETR with the MSMR 106*a* of the first VN 102*a*.

At 408, based at least in part on a first host onboarding with the first VN, it is determined that (i) the first host and a second host located in the second VN are permitted to communicate with one another and (ii) traffic from the first host destined for the second host should be routed to the service. For example, the first host 112*a* may onboard/join with the first VN 102*a*. The MSMR 106*a* may determine a steering policy that generally indicates whether or not the first host 112*a* is permitted to communicate with the second host 112*b*. The route mapping, e.g., steering policy, may also indicate that, based on one or more of the destination routing locator (RLOC), the destination ID, the source group tag and/or the destination group tag based on the security group tag of the first host 112*a*, that the traffic from the first host 112*a* destined for the second host 112*b* needs to be forwarded to the firewall service 110*a*.

At 410, based at least in part on the determining, the traffic is routed via the first VN to the service. For example, the traffic may be routed via the first VN 102*a* to the firewall service 110*a*.

At 412, based at least in part on the determining, the traffic is routed from the service via the border and the second VN to the second host. For example, the traffic may be routed from the firewall service 110*a* to the border 104*a*, which forwards the traffic via the second VN 102*b* to the second host 112*b*.

Thus, the techniques and architecture provide a map request that carries additional information using, for example, vendor specific LISP canonical address format (LCAF) with destination endpoint identifiers (EIDs) to indicate that destination lookup should be done across virtual networks/VRFs to find the DGT and other destination attributes even though RLOC is a local RLOC within the virtual network/VRF for service insertion. The techniques and architecture also provide a MSMR that keeps a service insertion policy to indicate which virtual networks/VRFs need to be searched to find destination attributes. Using the "service-insertion" command previously mentioned for the configuration, the list of virtual networks is built across which the searching may be performed. In some other cases there may be a default option of looking up all virtual networks/VRFs in case the number of virtual networks/VRFs in the deployment is limited/less and the user is trying to apply traffic steering or any other policy at ingress.

The techniques and architecture also provide that in situations where a destination is not located in any of the virtual networks/VRFs that are searched, calculation of hole, i.e., NMR (negative map-reply) or UMR (unknown map-reply) prefix is based on prefixes across all VNs/VRFs in the service insertion policy thus allowing the traffic to flow for unknown and known destinations. A reserved DGT may be used for unknown/internet destination in that case which is registered with border/ETR registration. The techniques and architecture also provide MSMR map replies that include one or more of: a) destination EID; b) service/firewall RLOC in source virtual network/VRF (this RLOC may contain vendor specific LCAF for service insertion to differentiate from destination RLOC); c) destination RLOC in destination virtual network/VRF; d) destination virtual network/VRF; and c) DGT.

The techniques and architecture also provide that upon receiving the map reply from the MSMR, the switch may apply the steering policy based on the source SGT and the DGT received. If the steering policy indicates that the the traffic should be redirected to the service, e.g., firewall service, the traffic may be encapsulated using service RLOC and the same source instance-id. If the steering policy indicates that the traffic may be directly forwarded, the traffic is either encapsulated using destination RLOC and destination instance-id (in SDA fabric) or forwarded natively (in non-SDA fabric). The techniques and architecture also provide, alternatively, the MSMR may also contain the steering policy and apply that in the control plane with the map reply. If the steering policy requires traffic to be sent to the firewall, the MSMR may reply with the service/firewall RLOC and the DGT. If the steering policy requires traffic to be sent directly to the destination without the service/firewall, the MSMR may reply with the destination RLOC, the destination instance id and the DGT (in SDA fabric) or NMR with native forwarding (non-SDA). The DGT may be cached in a map cache with the SGT and destination-rloc mapping. Whenever traffic with new a destination or a different SGT for the same destination is received, the destination/DGT may be resolved again by the MSMR.

FIG. 5 shows an example computer architecture for a computing device 502 capable of executing program components for implementing the functionality described above. In configurations, one or more of the computing devices 502 may be used to implement one or more of the components of FIGS. 1-4. The computer architecture shown in FIG. 5 illustrates a conventional server computer, workstation, desktop computer, laptop, tablet, network appliance, e-reader, smartphone, or other computing device, and can be utilized to execute any of the software components presented herein. The computing device 502 may, in some examples, correspond to a physical devices or resources described herein.

The computing device 502 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 502.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 502. The chipset 506 can further provide an interface to a computer-readable storage medium such as a read-only memory ("ROM") 510 or non-volatile RAM ("NVRAM") for storing basic routines that help to startup the computing device 502 and to transfer information between the various components and devices. The ROM 510 or NVRAM can also store other software components necessary for the operation of the computing device 502 in accordance with the configurations described herein.

The computing device 502 can operate in a networked environment using logical connections to remote computing devices and computer systems through a network, such as the network 508. The chipset 506 can include functionality for providing network connectivity through a NIC 512, such as a gigabit Ethernet adapter. The NIC 512 is capable of connecting the computing device 502 to other computing devices over the network 508. It should be appreciated that multiple NICs 512 can be present in the computing device 502, connecting the computer to other types of networks and remote computer systems.

The computing device 502 can be connected to a storage device 518 that provides non-volatile storage for the computer. The storage device 518 can store an operating system 520, programs 522, and data, which have been described in greater detail herein. The storage device 518 can be connected to the computing device 502 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 502 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 502 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 502 can further read information from the storage device 518 by detecting the physical states or characteristics of one or more particular locations within the physical storage units.

In addition to the mass storage device 518 described above, the computing device 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 502. In some examples, the operations performed by the cloud network, and or any components included therein, may be supported by one or more devices similar to computing device 502. Stated otherwise, some or all of the operations described herein may be performed by one or more computing devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 502.

In one embodiment, the storage device 518 or other computer-readable storage media is encoded with computer-executable instructions which, when loaded into the computing device 502, transform the computer from a general-purpose computing system into a special-purpose computer capable of implementing the embodiments described herein. These computer-executable instructions transform the computing device 502 by specifying how the CPUs 504 transition between states, as described above. According to one embodiment, the computing device 502 has access to computer-readable storage media storing computer-executable instructions which, when executed by the computing device 502, perform the various processes described above with regard to FIGS. 1-4. The computing device 502 can also include computer-readable storage media having instructions stored thereupon for performing any of the other computer-implemented operations described herein.

The computing device 502 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 502 might not include all of the components shown in FIG. 5, can include other components that are not explicitly shown in FIG. 5, or might utilize an architecture completely different than that shown in FIG. 5.

The computing device 502 may support a virtualization layer, such as one or more virtual resources executing on the computing device 502. In some examples, the virtualization layer may be supported by a hypervisor that provides one or more virtual machines running on the computing device 502 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method within a network comprising:

configuring a border of a first virtual network (VN) as a service egress tunnel router (ETR) to monitor a service prefix advertised via a service in (i) the first VN and (ii) a second VN;

advertising, by the service, the service prefix in the first VN and the second VN;

mapping, by the border with a controller of the first VN, registration of the border as the service ETR;

based at least in part on a first host onboarding with the first VN, determining a steering policy for traffic from the first host destined for a second host, wherein the second host is located in one of the first VN or the second VN; and based at least in part on the steering policy, routing the traffic via at least one of the first VN and the second VN to the second host, wherein determining the steering policy for traffic from the first host destined for the second host comprises:

receiving, at a switch of the first VN, traffic from the first host destined for the second host;

based at least in part on receiving the traffic, sending, by the switch of the first VN to the controller of the first VN, a map request relating to the second host in the second VN;

based at least in part on the map request, determining, by the controller of the first VN, that (i) the first host in the first VN and the second host are permitted to communicate with one another and (ii) the traffic is required to go to the service; and based at least in part on the determining that (i) the first host in the first VN and the second host are permitted to communicate with one another and (ii) the traffic is required to go to the service, receiving, at the switch of the first VN from the controller of the first VN, an address for the service, a destination VN, and a destination group tag.

2. The method of claim 1, wherein:

determining the steering policy comprises determining (i) the first host and the second host are permitted to communicate with one another and (ii) the traffic should be routed to the service; and the method further comprises:

routing the traffic via the first VN to the service; and routing the traffic from the service via the border and the second VN to the second host.

3. The method of claim 1, wherein mapping registration of the service ETR by the border with the controller of the first VN comprises storing the service ETR in a source instance registration table.

4. The method of claim 1, wherein mapping registration of the service ETR with the controller of the first VN comprises storing the service ETR in a service insertion table.

5. The method of claim 1, wherein determining the steering policy for traffic from the first host destined for the second host further comprises:

requesting, by the switch of the first VN from the controller of the first VN, a resolution of the steering policy for the service ETR; and based at least in part on requesting a service mapping, receiving, by the switch of the first VN from the controller of the first VN, one or more of the service ETR, a destination address, a destination instance-identification (ID)/VN, or a destination group tag.

6. The method of claim 5, wherein determining the resolution of the steering policy for the service ETR for traffic from the first host destined for the second host comprises:

searching, by the controller of the first VN, a source instance registration table for the service mapping comprising one or more of the service ETR, the destination address, the destination instance-ID/VN, and the destination group tag; and if the steering policy is not available in the source instance registration table, searching, by the controller of the first VN, a service insertion table for the steering policy comprising one or more of the destination address, the destination instance-ID/VN, and the destination group tag.

7. The method of claim 1, wherein determining the steering policy for traffic from the first host destined for the second host further comprises:

receiving, at a switch of the first VN, additional traffic from the first host destined for the second host;

based at least in part on receiving the additional traffic, sending, by the switch of the first VN to the controller of the first VN, another map request relating to the second host in the second VN;

based at least in part on the another map request, determining, by the controller of the first VN, that (i) the first host in the first VN and the second host are permitted to communicate with one another and (ii) the additional traffic is not required to go to the service; and based at least in part on the determining that (i) the first host in the first VN and the second host are permitted to communicate with one another and (ii) the additional traffic is not required to go to the service, receiving, at the switch of the first VN from the controller of the first VN, one or more of a destination group tag, a destination VN, or a destination instance-ID.

8. The method of claim 1, further comprising:

withdrawing, by the service, routes associated with the service; and de-registering, with the controller of the first VN, registration of the border as the service ETR.

9. A system comprising:

one or processors; and one or more non-transitory computer-readable media storing computer-executable instructions that, when executed by the one or more processors, cause the one or more processors to perform actions comprising:

configuring a border of a first virtual network (VN) as a service egress tunnel router (ETR) to monitor a service prefix advertised via a service in (i) the first VN and (ii) a second VN;

advertising, by the service, the service prefix in the first VN and the second VN;

mapping, by the border with a controller of the first VN, registration of the border as the service ETR;

based at least in part on a first host onboarding with the first VN, determining a steering policy for traffic from the first host destined for a second host, wherein the second host is located in one of the first VN or the second VN; and based at least in part on the steering policy, routing the traffic via at least one of the first VN and the second VN to the second host, wherein determining the steering policy for traffic from the first host destined for the second host comprises:

receiving, at a switch of the first VN, traffic from the first host destined for the second host;

based at least in part on receiving the traffic, sending, by the switch of the first VN to the controller of the first VN, a map request relating to the second host in the second VN;

based at least in part on the map request, determining, by the controller of the first VN, that (i) the first host in the first VN and the second host are permitted to communicate with one another and (ii) the traffic is required to go to the service; and based at least in part on the determining that (i) the first host in the first VN and the second host are permitted to communicate with one another and (ii) the traffic is required to go to the service, receiving, at the switch of the first VN from the controller of the first VN, an address for the service, a destination VN, and a destination group tag.

10. The system of claim 9, wherein:

determining the steering policy comprises determining (i) the first host and the second host are permitted to communicate with one another and (ii) the traffic should be routed to the service; and the actions further comprise:

routing the traffic via the first VN to the service; and routing the traffic from the service via the border and the second VN to the second host.

11. The system of claim 9, wherein mapping registration of the service ETR by the border with the controller of the first VN comprises storing the service ETR in a source instance registration table.

12. The system of claim 9, wherein mapping registration of the service ETR with the controller of the first VN comprises storing the service ETR in a service insertion table.

13. The system of claim 9, wherein determining the steering policy for traffic from the first host destined for the second host further comprises:

requesting, by the switch of the first VN from the controller of the first VN, a resolution of the steering policy for the service ETR; and based at least in part on requesting a service mapping, receiving, by the switch of the first VN from the controller of the first VN, one or more of the service ETR, a destination address, a destination instance-identification (ID)/VN, or a destination group tag.

14. The system of claim 13, wherein determining the resolution of the steering policy for the service ETR for traffic from the first host destined for the second host comprises:

searching, by the controller of the first VN, a source instance registration table for the service mapping comprising one or more of the service ETR, the destination address, the destination instance-ID/VN, and the destination group tag; and if the steering policy is not available in the source instance registration table, searching, by the controller of the first VN, a service insertion table for the steering policy comprising one or more of the destination address, the destination instance-ID/VN, and the destination group tag.

15. The system of claim 9, wherein determining the steering policy for traffic from the first host destined for the second host further comprises:

receiving, at a switch of the first VN, additional traffic from the first host destined for the second host;

based at least in part on receiving the additional traffic, sending, by the switch of the first VN to the controller of the first VN, another map request relating to the second host in the second VN;

based at least in part on the another map request, determining, by the controller of the first VN, that (i) the first host in the first VN and the second host are permitted to communicate with one another and (ii) the additional traffic is not required to go to the service; and based at least in part on the determining that (i) the first host in the first VN and the second host are permitted to communicate with one another and (ii) the additional traffic is not required to go to the service, receiving, at the switch of the first VN from the controller of the first VN, one or more of a destination group tag, a destination VN, or a destination instance-ID.

16. The system of claim 9, wherein the actions further comprise:

withdrawing, by the service, routes associated with the service; and de-registering, with the controller of the first VN, registration of the border as the service ETR.

17. A method comprising:

configuring a border of a first virtual network (VN) as a service-egress tunnel router (ETR) to monitor a service prefix advertised via a service in (i) the first VN and (ii) a second VN;

advertising, by the service, the service prefix in the first VN and the second VN;

mapping, by the border with a controller of the first VN, registration of the border as the service ETR;

based at least in part on a first host onboarding with the first VN, determining (i) the first host and a second host located in the second VN are permitted to communicate with one another and (ii) traffic from the first host destined for the second host should be routed to the service; and based at least in part on the determining:

routing the traffic via the first VN to the service; and routing the traffic from the service via the border and the second VN to the second host, wherein determining (i) the first host and the second host located in the second VN are permitted to communicate with one another and (ii) traffic from the first host destined for the second host should be routed to the service comprises:

requesting, by a switch of the first VN from the controller of the first VN, a steering policy; and based at least in part on the requesting the steering policy, receiving, by the switch of the first VN from the controller of the first VN, one or more of the service ETR, a destination address, a destination ID, or a destination group tag.

18. The method of claim 17, wherein mapping registration of the service ETR by the border with the controller of the first VN comprises storing the service ETR in a source instance registration table.

19. The method of claim 17, wherein mapping registration of the service ETR with the controller of the first VN comprises storing the service ETR in a service insertion table.

20. The method of claim 19, further comprising:

withdrawing, by the service, routes associated with the service; and de-registering registration of the border as the service ETR.

* * * * *